(12) United States Patent
Joeng

(10) Patent No.: US 9,145,124 B2
(45) Date of Patent: Sep. 29, 2015

(54) ELECTRIC FOUR WHEEL DRIVE SYSTEM OF DUAL CLUTCH TYPE FOR PROVIDING TORQUE VECTORING AND CONTROL METHOD OF THE SAME

(71) Applicant: Hyundai Motor Company, Seoul (KR)

(72) Inventor: Ji Yoel Joeng, Gwangmyeong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 99 days.

(21) Appl. No.: 14/029,293

(22) Filed: Sep. 17, 2013

(65) Prior Publication Data
US 2014/0296028 A1    Oct. 2, 2014

(30) Foreign Application Priority Data
Mar. 26, 2013  (KR) .................. 10-2013-0032190

(51) Int. Cl.
| | |
|---|---|
| *B60W 10/02* | (2006.01) |
| *B60W 10/08* | (2006.01) |
| *B60K 6/52* | (2007.10) |
| *B60W 10/16* | (2012.01) |
| *B60W 10/196* | (2012.01) |
| *B60W 20/00* | (2006.01) |
| *B60T 1/10* | (2006.01) |

(52) U.S. Cl.
CPC .................. *B60W 10/08* (2013.01); *B60K 6/52* (2013.01); *B60T 1/10* (2013.01); *B60W 10/16* (2013.01); *B60W 10/196* (2013.01); *B60W 20/00* (2013.01); *B60W 2720/406* (2013.01); *Y02T 10/7005* (2013.01); *Y10T 477/322* (2015.01)

(58) Field of Classification Search
CPC .............. B60K 6/20; B60K 6/22; B60K 6/24; B60K 6/26; B60K 6/36; B60K 6/387; B60K 6/448; B60K 6/485; B60K 6/52; B60W 10/02; B60W 10/08; B60W 10/119; B60W 10/14; B60W 10/188; B60W 20/40
See application file for complete search history.

(56) References Cited

U.S. PATENT DOCUMENTS

| | | | | |
|---|---|---|---|---|
| 8,241,173 | B2 * | 8/2012 | Holmes et al. ..................... | 477/3 |
| 2002/0061803 | A1 * | 5/2002 | Aoki ................................. | 477/3 |
| 2003/0037977 | A1 * | 2/2003 | Tatara et al. ................. | 180/65.3 |
| 2013/0066499 | A1 * | 3/2013 | Niste et al. ...................... | 701/22 |

FOREIGN PATENT DOCUMENTS

| | | |
|---|---|---|
| JP | 2003-063265 A | 3/2003 |
| KR | 10-2009-0111184 A | 10/2009 |

* cited by examiner

*Primary Examiner* — Edwin A Young
(74) *Attorney, Agent, or Firm* — McDermott Will & Emery LLP

(57) ABSTRACT

An electric four wheel drive system of a dual clutch type includes dual clutches selectively preventing power from being transmitted to both driving wheels from a motor. A motor housing is mounted on the motor and a hydraulic valve assembly mounted on the motor housing providing operating hydraulic pressure to the dual clutches. The hydraulic valve assembly controls the dual clutches using the hydraulic pressure generated by a hydraulic pressure generator of a regenerative braking system.

9 Claims, 3 Drawing Sheets

ELECTRIC FOUR WHEEL DRIVE SYSTEM OF DUAL CLUTCH TYPE FOR PROVIDING TORQUE VECTORING AND CONTROL METHOD OF THE SAME

CROSS-REFERENCE TO RELATED APPLICATION

This application claims the benefit of priority to Korean Patent Application No. 10-2013-0032190 filed in the Korean Intellectual Property Office on Mar. 26, 2013, the entire contents of which are incorporated herein by reference.

TECHNICAL FIELD

The present disclosure relates to an electric four wheel drive system. More particularly, the present disclosure relates to an electric four wheel drive system of a dual clutch type for providing torque vectoring and a control method of the same.

BACKGROUND

An electric four wheel drive (e-4WD) system can achieve both of a 4WD function and a hybrid electric vehicle (HEV) function by driving the rear wheels of a front-engine in a front-wheel drive vehicle.

Vehicles equipped with an electric four wheel drive system have an engine and a transmission connected to the front wheels. The electric four wheel drive vehicles have a power generator which charges a high-voltage battery using the mechanical energy from the engine.

A motor and a reduction gear, that are driven by electrical energy, are connected to the rear wheels, and the output from the motor and the reduction gear can be transmitted to the rear wheels.

In a regenerative braking mode, braking and inertia energy can be recovered by the motor, and the high-voltage battery can be charged by the recovered energy.

As a type of the electric four wheel drive system, there is a dual clutch type equipped with a dual clutch selectively preventing power transmitted to the rear wheels from the driving elements of the reduction gear and the motor.

An electric four wheel drive system of the dual clutch type includes power transmission mechanisms at both sides of a drive shaft of a hollow motor and multi-plate clutches selectively connecting driving elements with the rear wheels.

The electric four wheel drive system of the dual clutch type can selectively connect the driving elements with the rear wheels by means of the multi-plate clutches and can achieve torque vectoring that actively distributes driving torque to the rear wheels.

The electric four wheel drive system of the dual clutch type is equipped with hydraulic pressure generators that operate the multi-plate clutches, respectively, in order to achieve torque vectoring. The hydraulic pressure generator includes a hydraulic pump disposed in a housing and generating hydraulic pressure, a hydraulic motor providing a driving force to the hydraulic pump, and hydraulic valves and hydraulic lines for supplying the hydraulic pressure to the clutches, respectively.

The electric four wheel drive system of the dual clutch type can control the hydraulic pressure generator in accordance with a torque vectoring duty calculated on the basis of conditions such as understeer and oversteer.

According to the related art, the electric four wheel drive system of an dual clutch type can distribute the torque of the driving elements to one of the rear wheels by controlling the multi-plate clutches by means of the hydraulic pressure generator in accordance with traveling conditions of the vehicle.

However, since the electric four wheel drive system of the dual clutch type includes the pump housing, the hydraulic pump, the motor, the valve housing, and the hydraulic valves, which are components of the hydraulic pressure generator for driving the multi-plate clutches, it is disadvantageous in terms of the entire weight, cost, size, fuel efficiency. In addition, the structure is complicated.

The above information disclosed in this Background section is only for enhancement of understanding of the background of the disclosure and, therefore, it may contain information that does not form the prior art that is already known in this country to a person of ordinary skill in the art.

SUMMARY

The present disclosure provides an electric four wheel drive system of a dual clutch type having advantages of being able to simplify a configuration of a hydraulic pressure generator that operates dual clutches, and a control method of the system. According to exemplary embodiments of the present disclosure, an electric four wheel drive system of a dual clutch type can simplify the configuration of the hydraulic pressure generator that operates the dual clutches to achieve torque vectoring.

In an exemplary embodiment of the present disclosure, an electric four wheel drive system of a dual clutch type includes dual clutches selectively preventing power transmitted to both driving wheels from a motor. The system may include a motor housing mounted on the motor and a hydraulic valve assembly mounted on the motor housing and providing an operating hydraulic pressure to the dual clutches. The hydraulic valve assembly may control the dual clutches, using the hydraulic pressure generated by a hydraulic pressure generator of a regenerative braking system.

The hydraulic pressure generator and the hydraulic valve assembly may be connected by a connection line.

The hydraulic valve assembly may be connected with a hydraulic booster of the hydraulic pressure generator by the connection line.

The hydraulic valve assembly may be connected to the dual clutches by hydraulic lines.

The hydraulic valve assembly may include a valve housing mounted at the motor housing and a valve body disposed in the valve housing and connected with the connection line and the hydraulic lines.

The electric four wheel drive system may provide the operating hydraulic pressure to the dual clutches by means of the hydraulic pressure generator and the hydraulic valve assembly and may achieve torque vectoring for the rear wheels.

The system may further include a controller separately controlling the dual clutches in accordance with a torque vectoring duty calculated on the basis of traveling conditions of a vehicle.

According to another exemplary embodiment of the present disclosure, a control method of an electric four wheel drive system of a dual clutch type includes dual clutches selectively preventing power from being transmitted to both driving wheels from a motor. The method may include (a) sensing traveling conditions of a vehicle, (b) calculating a torque vectoring duty for both rear wheels in accordance with the traveling conditions of the vehicle, and (c) supplying an operating hydraulic pressure, which is generated and stored by a hydraulic pressure generator of a regenerative braking system, to any one of the dual clutches by supplying an electric signal to a hydraulic valve assembly in accordance with the torque vectoring duty.

The traveling conditions in step (a) may include the vehicle speed, steering angle, yaw rate, steering torque, lateral acceleration, and accelerator pedal position.

In step (c), a connection line connecting the hydraulic valve assembly and the hydraulic pressure generator with each other may be opened, and any one of hydraulic lines connecting the hydraulic valve assembly and the dual clutches may be opened.

In step (b), the torque vectoring duty may be made in the form of a map in accordance with the magnitude of steering angle and yaw rate traveling conditions of a vehicle.

According to exemplary embodiments of the present disclosure, it is possible to achieve torque vectoring of the rear wheels according to a behavior of the vehicle, using the operating hydraulic pressure of the regenerative braking system, such that it is advantageous in terms of the weight, manufacturing cost, size of the entire system, and the fuel efficiency of the vehicle, and thus the structure for controlling torque vectoring is simplified.

BRIEF DESCRIPTION OF THE DRAWINGS

The drawings are provided for reference in describing exemplary embodiments of the present disclosure, and the spirit of the present disclosure should not be construed only by the accompanying drawings.

DETAILED DESCRIPTION

Figure 1:
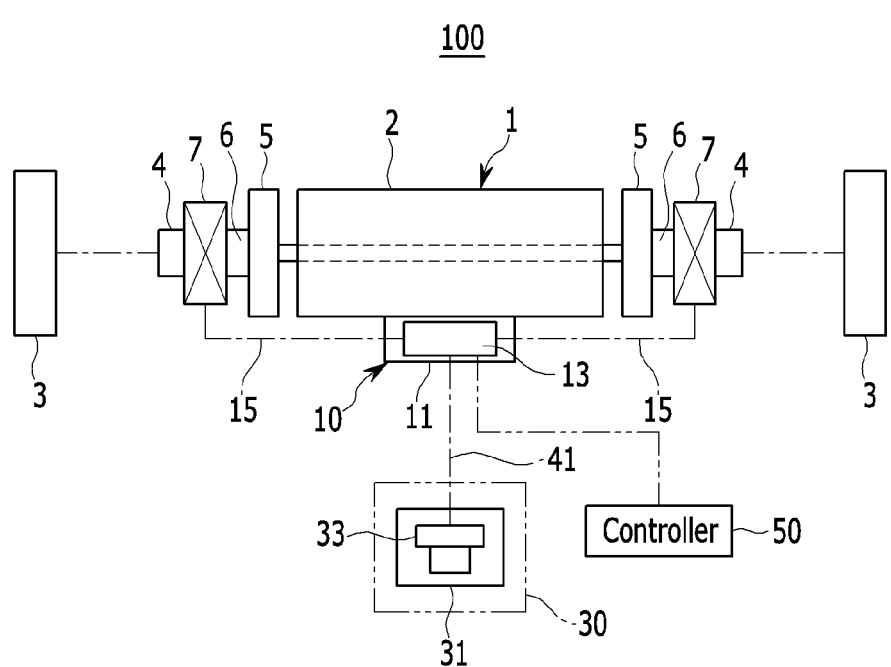
FIG. 1 is a block diagram schematically showing an electric four wheel drive system of a dual clutch type according to an exemplary embodiment of the present disclosure.

Hereinafter, the present disclosure will be described more fully with reference to the accompanying drawings, in which exemplary embodiments of the disclosure are shown. As those skilled in the art would realize, the described embodiments may be modified in various different ways, all without departing from the spirit or scope of the present disclosure.

The unrelated parts to the description of the exemplary embodiments are not shown to make the description clear and like reference numerals designate like element throughout the specification.

Further, the sizes and thicknesses of the configurations shown in the drawings are provided selectively for the convenience of description, so that the present disclosure is not limited to those shown in the drawings, and the thicknesses are exaggerated to make some parts and regions clear.

Further, the terms, " . . . unit", " . . . mechanism", " . . . portion", " . . . member" etc. used herein mean the unit of inclusive components performing at least one or more functions or operations.

FIG. 1 is a block diagram schematically showing an electric four wheel drive system of a dual clutch type according to an exemplary embodiment of the present disclosure.

Referring to FIG. 1, an electric four wheel drive system 100 according to an exemplary embodiment of the present disclosure can be used for a vehicle that drives front wheels with torque from an engine and drives rear wheels 3 with torque from a motor 1.

That is, the electric four wheel drive system 100 can be used for environmentally-friendly vehicles that use the torque from the engine as a main power and the torque from the motor 1 driven by electrical energy as an auxiliary power.

The vehicles equipped with the electric four wheel drive system 100 have a power generator, which converts mechanical energy of the engine installed adjacent the front wheels into electrical energy.

The electric four wheel drive system 100 can drive the left and right rear wheels 3 with the torque from the motor 1 in front wheel engine drive vehicles thereby ensuring traction on a slippery road.

Further, the electric four wheel drive system 100 can reduce the weight of the vehicle and minimize power loss when traveling by removing a propeller shaft.

For example, the electric four wheel drive system 100 according to an exemplary embodiment of the present disclosure may be an in-line type that uses one motor 1 and transmits the torque from the motor 1 to the left and right rear wheels 3.

The electric four wheel drive system 100 includes the hollow motor 1 and power transmission mechanisms 5 connected to both sides of a driving shaft of the motor 1. The motor 1 includes a motor housing 2, and the power transmission mechanism 5 may include a known reduction or differential gear.

Further, the electric four wheel drive system 100 includes dual clutches 7 selectively engaging or disengaging driving elements 6 of the power transmission mechanisms 5 and driven elements 4 of the rear wheels 3.

The dual clutches 7 are disposed at the left and right sides of the motor 1, respectively, and each may include a multi-plate clutch operated by an operating hydraulic pressure. The dual clutches 7 can selectively prevent the power from being transmitted to the driven elements 4 of the rear wheels 3 from the driving wheels 6 of the power transmission mechanisms 5.

That is, the dual clutches 7 can connect (engage) the driving elements 6 of the power transmission mechanisms 5 and the driven elements 4 of the rear wheels 3 with each other and transmit the power supplied to the driving elements 6 from the motor 1 to the driven elements 4, under an acceleration condition and a regenerative braking condition.

The dual clutches 7 can further disconnect the driving elements 6 of the power transmission mechanisms 5 and the driven elements 4 of the rear wheels 3 from each other and can prevent the power from being transmitted to the driven elements 4 from the driving elements 6, under an acceleration and a deceleration condition at a reference speed or higher.

The electric four wheel drive system 100 according to an exemplary embodiment of the present disclosure equipped with the dual clutches 7 is generally called an electric four wheel drive system of a dual clutch type in the related art.

Since the electric four wheel drive system of a dual clutch type 100 according to an exemplary embodiment of the present disclosure can selectively connect or disconnect the driving elements 6 by means of the dual clutches 7, the system achieves torque vectoring that actively distributes the driving torque of the driving elements 6 to the driven elements 4 of the rear wheels 3.

In the electric four wheel drive system 100, the combined structure of the motor 1 and the power transmission mechanism 5, the configuration of the dual clutches 7, and the structure of the dual clutches 7 have been known in the art and the detailed description is not provided herein.

The electric four wheel drive system of a dual clutch type 100 according to an exemplary embodiment of the present disclosure can operate the dual clutches 7 with a simple configuration for achieving torque vectoring for the rear wheels 3.

The electric four wheel drive system of a dual clutch type 100 according to an exemplary embodiment of the present disclosure includes a hydraulic valve assembly 10 disposed in the motor housing 2 and a controller 50 controlling the dual clutches 7.

The hydraulic valve assembly 10 supplies a substantial amount of operating hydraulic pressure to the dual clutches 7 to achieve torque vectoring for the rear wheels 3 through the dual clutches 7. That is, the hydraulic valve assembly 10 can supply the operating hydraulic pressure to any one of the dual clutches 7 in accordance with a torque vectoring duty calculated on the basis of the traveling conditions of the vehicle.

The steps for calculating a torque vectoring duty according to the traveling of a vehicle and for supplying the operating hydraulic pressure relating to the torque vectoring duty will be described in more detail below.

The hydraulic valve assembly 10 includes a valve housing 11 disposed on the motor housing 2 and a valve body 13 disposed in the valve housing 11. The valve body 13 may include a 3-way solenoid valve. The valve body 13 may be connected to the dual clutches 7 through hydraulic lines 15.

In an exemplary embodiment of the present disclosure, the hydraulic valve assembly 10 may be connected with a hydraulic pressure generator 31 in a regenerative braking system 30 of a vehicle to supply the operating hydraulic pressure to the dual clutches 7.

The regenerative braking system 30 absorbs regenerative braking torque, generates a regenerative braking force using the power generator described above, except a braking force by the hydraulic pressure, and stores electric energy generated by the power generator in a battery.

The regenerative braking system 30 can apply the hydraulic pressure of maximum 150~200 bar to a wheel brake and maintain stable braking of the vehicle.

The regenerative braking system 30 includes the hydraulic pressure generator 31 that generates and stores hydraulic pressure. The hydraulic pressure generator 31 includes a hydraulic booster 33 that generates and stores a high hydraulic pressure by means of a pump, a motor, an accumulator, etc.

The regenerative braking system 30 is a regenerative braking system known to those skilled in the art, and thus the detailed description is omitted herein.

In an exemplary embodiment of the present disclosure, the hydraulic pressure generated and stored in the hydraulic pressure generator 31 of the regenerative braking system 30 may be used as the operating hydraulic pressure of the dual clutches 7 for achieving torque vectoring.

The hydraulic valve assembly 10 according to an exemplary embodiment of the present disclosure is connected with the hydraulic pressure generator 31. The valve body 13 of the hydraulic valve assembly 10 may be connected with the hydraulic booster 33 of the hydraulic pressure generator 31 through a connection line 41.

Therefore, the electric four wheel drive system of a dual clutch type 100 according to an exemplary embodiment of the present disclosure can provide the hydraulic pressure to the dual clutches 7, by the hydraulic pressure generator 31 and the hydraulic valve assembly 10, and achieve torque vectoring for the rear wheels 3.

According to an exemplary embodiment of the present disclosure, the controller 50 controls the electric four wheel driving system 100 and can further control the hydraulic valve assembly 10 and the dual clutches 7 in accordance with the torque vectoring duty calculated on the basis of traveling conditions of the vehicle.

The control method of the electric four wheel driving system 100 according to an exemplary embodiment of the present disclosure is described in detail with reference to the accompanying drawings.

Figure 2:
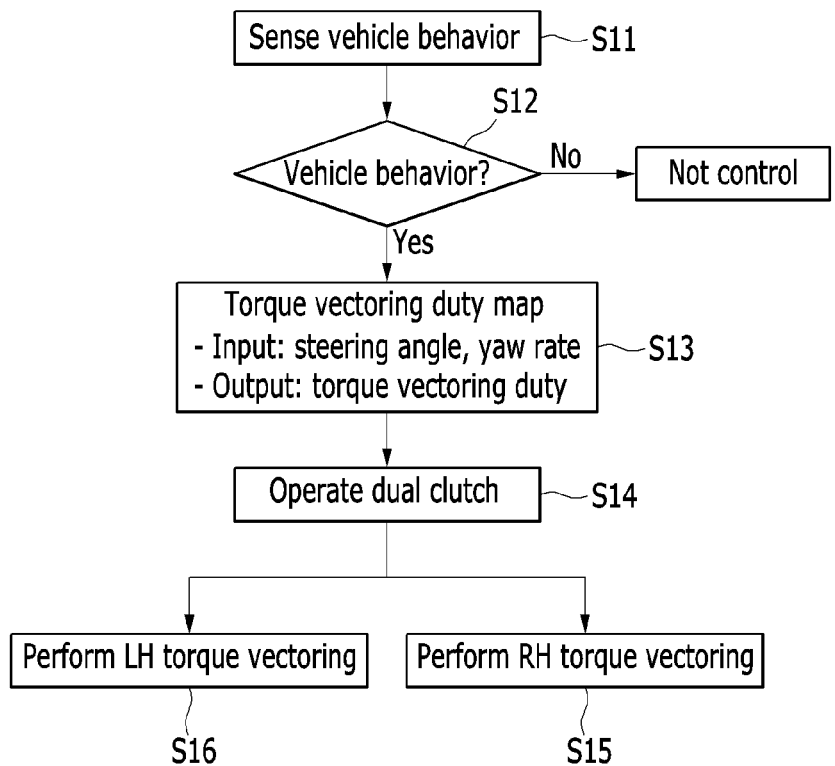
FIG. 2 is a flowchart illustrating a control method of an electric four wheel drive system of a dual clutch type according to an exemplary embodiment of the present disclosure.

FIG. 2 is a flowchart illustrating a control method of an electric four wheel drive system of a dual clutch type according to an exemplary embodiment of the present disclosure.

In an exemplary embodiment of the present disclosure, to achieve torque vectoring for the rear wheels 3 when the vehicle travels, the driving elements 6 of the power transmission mechanism 5 and the driven elements 4 of the rear wheels 3 are not connected through the dual clutches 7.

Referring to FIGS. 1 and 2, the traveling conditions of the vehicle are sensed as described above in an exemplary embodiment of the present disclosure (S11).

In S11, sensors, which are mounted in the vehicle, sense the vehicle speed, steering angle, yaw rate, steering torque, lateral acceleration, and accelerator pedal position, and output the sensed signals to the controller 50.

Then, the controller 50 determines whether there are understeer and oversteer, or slipping due to the driver's intention of steering and accelerating while the vehicle travels (S12).

Understeer and oversteer behavior or slipping due to the driver's intention of steering and accelerating while the vehicle travels may be defined hereafter as the traveling conditions.

When it is determined that a torque vectoring condition was generated in S12, a torque vectoring duty for the rear wheels 3 is calculated using a vectoring duty map in an exemplary embodiment of the present disclosure (S13).

Figure 3:
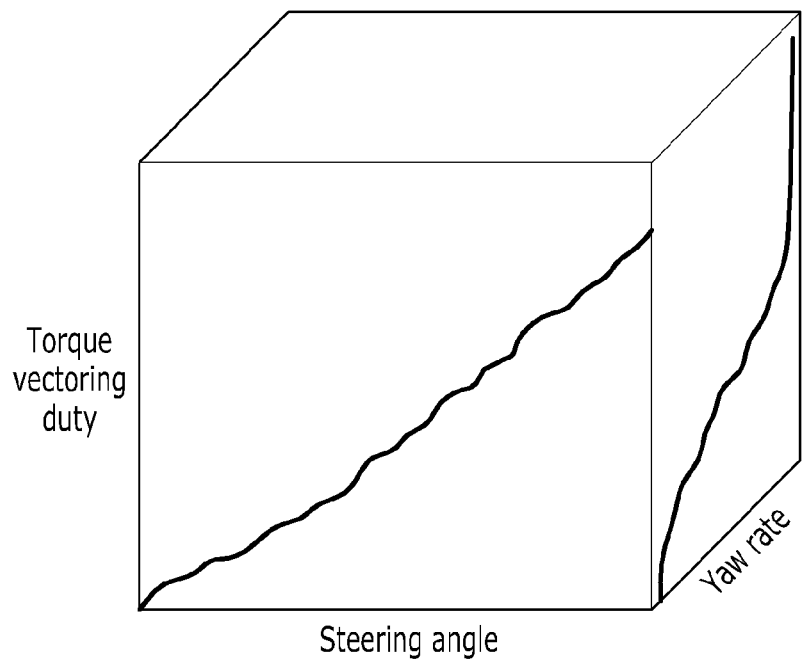
FIG. 3 is a graph showing the relationship of a steering angle, yaw rate, and a torque vectoring duty to illustrate the control method of an electric four wheel drive system of a dual clutch type according to an exemplary embodiment of the present disclosure.

For example, the torque vectoring duty for the rear wheels 3 may be made in the form of a map in accordance with the magnitude of the steering angle and yaw rate, as shown in FIG. 3.

According to an exemplary embodiment of the present disclosure, the operating hydraulic pressure is generated and stored in the hydraulic pressure generator 31 of the regenerative braking system 30 by supplying an electric signal to the hydraulic valve assembly 10 in accordance with the torque vectoring duty supplied to any one of the dual clutches 7 (S14).

In S14, the connection line 41 connecting the valve body 13 of the hydraulic valve assembly 10 and the hydraulic booster 33 of the hydraulic pressure generator 31 with each other is opened, and any one of the hydraulic lines 15 connecting the valve body 31 with the dual clutches 7 is opened.

In an exemplary embodiment of the present disclosure, the operating hydraulic pressure stored in the hydraulic pressure generator 31 is supplied to any one of the dual clutches 7 through the connection line 41 and the hydraulic lines 15 by the hydraulic valve assembly 10, thereby operating the corresponding clutch.

In an exemplary embodiment of the present invention, torque vectoring for the rear wheels 3 can be controlled on the basis of the torque vectoring duty according to the traveling conditions of the vehicle (S15 and S16). Therefore, it is possible to achieve the torque vectoring for actively distributing the driving torque of the driving elements 6 to the driven elements of the rear wheels 3 by selectively connecting the driving elements 6 and the driven elements 4 of the rear wheels with each other through the dual clutches 7.

For example, in understeering behavior of the vehicle according to an exemplary embodiment of the present disclosure, the vehicle reaction time can be improved by driving the outer wheel (right rear wheel) in turning, on the basis of the torque vectoring duty through torque vectoring (S15).

In this process, the operating hydraulic pressure generated and stored in the hydraulic pressure generator 31 of the regenerative braking system 30 is transferred to the clutch 7 of the outer wheel through the hydraulic valve assembly 10 when turning, such that the driving element 6 and the driven element 4 of the outer wheel are connected.

In the oversteer behavior of the vehicle according to an exemplary embodiment of the present disclosure, stability of the vehicle in turning can be improved by driving the inner wheel (left rear wheel) in turning on the basis of the torque vectoring duty through torque vectoring (S16).

In this process, the operating hydraulic pressure generated and stored in the hydraulic pressure generator 31 of the regenerative braking system 30 is transferred to the clutch 7 of the inner wheel through the hydraulic valve assembly 10 when turning, such that the driving element 6 and the driven element 4 of the inner wheel are connected.

When the amount of slip of the inner wheel and the outer wheel are different when the vehicle travels, it is possible to reduce the amount of slip of the vehicle or improve the traveling performance by a torque vectoring control on the rear wheels 3, as described above.

According to an exemplary embodiment of the present disclosure, since the dual clutches 7 are operated by the operating hydraulic pressure generated and stored in the hydraulic pressure generator 31 of the regenerative braking system 30, as described above, the torque vectoring for the rear wheels 3 can be controlled.

According to the electric four wheel drive system of the dual clutch type 100 of an exemplary embodiment of the present disclosure, it is possible to achieve torque vectoring of the rear wheels 3 according to the behavior of a vehicle using the operating hydraulic pressure of the regenerative braking system 30. Therefore, it is advantageous in terms of the weight, manufacturing cost, size of the entire system, and the fuel efficiency of a vehicle. In addition, the structure for controlling torque vectoring is simplified.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. An electric four wheel drive system, which includes dual clutches selectively preventing power from being transmitted to rear wheels from a motor, the system comprising:
   a motor housing mounted on the motor;
   a hydraulic valve assembly mounted on the motor housing and providing an operating hydraulic pressure to the dual clutches; and
   a controller separately controlling the dual clutches in accordance with a torque vectoring duty calculated based on traveling conditions of a vehicle,
   wherein the hydraulic valve assembly controls the dual clutches, using hydraulic pressure generated by a hydraulic pressure generator of a regenerative braking system,
   wherein the hydraulic pressure generator and the hydraulic valve assembly are connected by a connection line, and
   wherein the electric four wheel drive system provides the operating hydraulic pressure to the dual clutches by means of the hydraulic pressure generator and the hydraulic valve assembly and achieves torque vectoring for the rear wheels.

2. The system of claim 1, wherein the hydraulic valve assembly is connected with a hydraulic booster of the hydraulic pressure generator by the connection line.

3. The system of claim 2, wherein the hydraulic pressure generator includes the hydraulic booster.

4. The system of claim 2, wherein the hydraulic valve assembly is directly connected to the hydraulic booster of the hydraulic pressure generator by the connection line.

5. The system of claim 1, wherein the hydraulic valve assembly is connected to the dual clutches by hydraulic lines.

6. The system of claim 5, wherein the hydraulic valve assembly includes a valve housing mounted at the motor housing and a valve body disposed in the valve housing and connected with the connection line and the hydraulic lines.

7. A control method of an electric four wheel drive system including dual clutches selectively preventing power from being transmitted to rear wheels from a motor, the method comprising:
   sensing traveling conditions of a vehicle;
   calculating a torque vectoring duty for both rear wheels in accordance with the traveling conditions of the vehicle; and
   supplying an operating hydraulic pressure, which is generated and stored by a hydraulic pressure generator of a regenerative braking system, to any one of the dual clutches by supplying an electric signal to a hydraulic valve assembly mounted on a housing of the motor in accordance with the torque vectoring duty,
   wherein the step of supplying the operating hydraulic pressure includes opening a connection line connecting the hydraulic valve assembly to the hydraulic pressure generator and opening at least one of hydraulic lines connecting the hydraulic valve assembly and the dual clutches.

8. The method of claim 7, wherein the traveling conditions include vehicle speed, steering angle, yaw rate, steering torque, lateral acceleration, and accelerator pedal position.

9. The method of claim 7, wherein in the step of calculating of the torque vectoring duty, the torque vectoring duty is made in the form of a map in accordance with a magnitude of steering angle and yaw rate traveling conditions of the vehicle.

* * * * *